US012578527B2

(12) United States Patent
Dosunmu et al.

(10) Patent No.: US 12,578,527 B2
(45) Date of Patent: Mar. 17, 2026

(54) RECONFIGURABLE OPTICAL INTERCONNECTS FOR CO-PACKAGED DEVICES INCLUDING PHOTONIC INTEGRATED CIRCUITS

(71) Applicant: Applied Materials, Inc., Santa Clara, CA (US)

(72) Inventors: Olufemi I. Dosunmu, San Jose, CA (US); Zijiao Yang, Fremont, CA (US); Jinxin Fu, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 17 days.

(21) Appl. No.: 19/083,215

(22) Filed: Mar. 18, 2025

(65) Prior Publication Data

US 2025/0370182 A1     Dec. 4, 2025

Related U.S. Application Data

(60) Provisional application No. 63/654,163, filed on May 31, 2024.

(51) Int. Cl.
*G02B 6/12* (2006.01)

(52) U.S. Cl.
CPC ..... *G02B 6/12004* (2013.01); *G02B 6/12007* (2013.01)

(58) Field of Classification Search
CPC ....................................................... G02B 6/12
USPC ........................................................... 385/24
See application file for complete search history.

(56) References Cited

U.S. PATENT DOCUMENTS

| | | | |
|---|---|---|---|
| 8,837,878 | B2 | 9/2014 | Chen |
| 11,435,528 | B1 | 9/2022 | Gao |
| 12,055,766 | B2 * | 8/2024 | Pupalaikis ........... G02B 6/3628 |
| 12,149,242 | B1 * | 11/2024 | Gimeno-Segovia ... G06N 10/40 |
| 2017/0207600 | A1 | 7/2017 | Klamkin |
| 2021/0318503 | A1 | 10/2021 | Kalman |
| 2021/0320726 | A1 | 10/2021 | Kalman |
| 2022/0044092 | A1 | 2/2022 | Pleros et al. |
| 2022/0065407 | A1 | 3/2022 | Wei |
| 2022/0263586 | A1 * | 8/2022 | Winzer ................ G02B 6/4293 |
| 2022/0381986 | A1 | 12/2022 | Young et al. |
| 2023/0296854 | A1 | 9/2023 | Winterbottom et al. |
| 2023/0354541 | A1 * | 11/2023 | Cole ......................... H05K 7/10 |

(Continued)

FOREIGN PATENT DOCUMENTS

| | | | | |
|---|---|---|---|---|
| WO | WO-2022067268 | A2 * | 3/2022 | ........... G01J 1/0214 |
| WO | WO-2023168095 | A1 * | 9/2023 | ........... G02B 6/4249 |

OTHER PUBLICATIONS

International Search Report and Written Opinion for International Application No. PCT/US2025/031795, mailed Sep. 29, 2025, 11 Pages.

*Primary Examiner* — Kaveh C Kianni
(74) *Attorney, Agent, or Firm* — Lowenstein Sandler LLP

(57) ABSTRACT

A system includes an optical interconnect and a set of photonic integrated circuits (PICs) integrated within the optical interconnect. The optical interconnect includes a plurality of optical switches, a plurality of multiplexers, and a plurality of sets of optical splitters. Each multiplexer of the plurality of multiplexers is coupled to each optical switch of the set of optical switches, and each set of optical splitters of the plurality of sets of optical splitters is coupled to a respective multiplexer of the plurality of multiplexers.

20 Claims, 11 Drawing Sheets

(56)     References Cited

U.S. PATENT DOCUMENTS

| 2023/0366913 | A1* | 11/2023 | Kamineni | ........... | H10F 77/1437 |
| 2023/0418002 | A1 | 12/2023 | Tseng | | |
| 2024/0012112 | A1 | 1/2024 | Warke et al. | | |
| 2024/0027698 | A1 | 1/2024 | Psaila | | |
| 2024/0036365 | A1 | 2/2024 | Peng et al. | | |
| 2024/0061170 | A1 | 2/2024 | Wei | | |
| 2024/0369783 | A1 | 11/2024 | Yu | | |
| 2024/0427097 | A1* | 12/2024 | Yu | ........................ | G02B 6/4239 |

* cited by examiner

320

$\lambda_1\lambda_2\lambda_3\lambda_4$      $\lambda_1\lambda_2\lambda_3\lambda_4$ $\lambda_1\lambda_2\lambda_3\lambda_4$      $\lambda_1\lambda_2\lambda_3\lambda_4$ $\lambda_1\lambda_2\lambda_3\lambda_4$      $\lambda_1\lambda_2\lambda_3\lambda_4$ $\lambda_1\lambda_2\lambda_3\lambda_4$      $\lambda_1\lambda_2\lambda_3\lambda_4$ $\lambda_1\lambda_2\lambda_3\lambda_4$      $\lambda_1\lambda_2\lambda_3\lambda_4$ $\lambda_1\lambda_2\lambda_3\lambda_4$      $\lambda_1\lambda_2\lambda_3\lambda_4$ $\lambda_1\lambda_2\lambda_3\lambda_4$      $\lambda_1\lambda_2\lambda_3\lambda_4$ $\lambda_1\lambda_2\lambda_3\lambda_4$      $\lambda_1\lambda_2\lambda_3\lambda_4$ 315      324-1   324-2   324-3   324-4     322    335

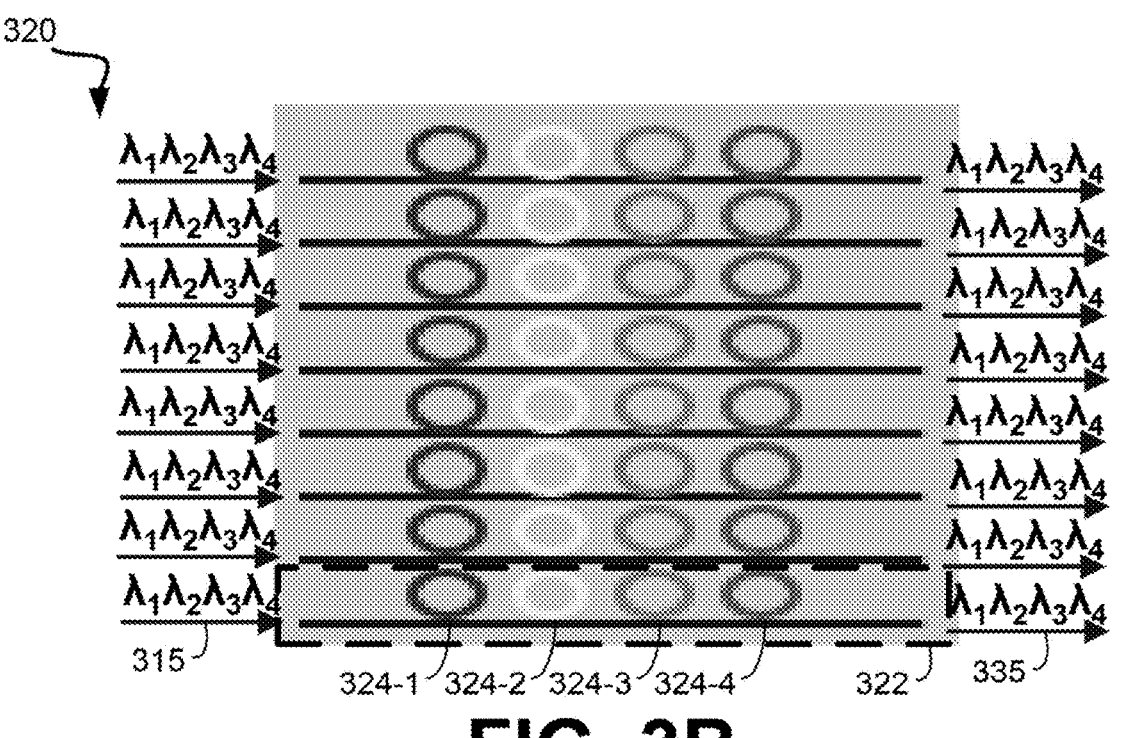

$\lambda_1\lambda_2\lambda_3\lambda_4$ $\lambda_1\lambda_2\lambda_3\lambda_4$ $\lambda_1\lambda_2\lambda_3\lambda_4$ $\lambda_1\lambda_2\lambda_3\lambda_4$ $\lambda_1\lambda_2\lambda_3\lambda_4$ $\lambda_1\lambda_2\lambda_3\lambda_4$ $\lambda_1\lambda_2\lambda_3\lambda_4$ $\lambda_1\lambda_2\lambda_3\lambda_4$ 356      354-1   354-2   354-3   354-4     352    345

Obtain at least one interconnect
710

Obtain at least one PIC
720

Form a device including the at least one
interconnect and the at least one PIC
730

710

RECONFIGURABLE OPTICAL INTERCONNECTS FOR CO-PACKAGED DEVICES INCLUDING PHOTONIC INTEGRATED CIRCUITS

CROSS-REFERENCE TO RELATED APPLICATION(S)

The present application claims priority to U.S. Provisional Patent Application No. 63/654,163, filed on May 31, 2024 and entitled "RECONFIGURABLE OPTICAL INTERCONNECTS FOR CO-PACKAGED DEVICES INCLUDING PHOTONIC INTEGRATED CIRCUITS", the entire contents of which are hereby incorporated by reference herein.

TECHNICAL FIELD

Embodiments of the present disclosure relate to optical systems, and more particularly to reconfigurable optical interconnects (e.g., interposers) for co-packaged optical devices including photonic integrated circuits (PICs).

BACKGROUND

In an optical system, an optical signal can travel through a waveguide (e.g., optical fiber) that is formed from an inner core made of a first material having a first index of refraction and an outer cladding made of a second material having a second index of refraction less than the first index of refraction. For example, the first material and the second material can each be formed from a different type of glass. Thus, when an optical signal traveling in a waveguide is incident on the boundary between the inner core and the outer cladding at an angle exceeding the critical angle, the optical signal can exhibit total internal reflection.

SUMMARY

In some embodiments, a system includes an optical interconnect, and a set of photonic integrated circuits (PICs) disposed on the optical interconnect. The optical interconnect includes a plurality of optical switches, a plurality of multiplexers, and a plurality of sets of optical splitters. Each multiplexer of the plurality of multiplexers is coupled to each optical switch of the set of optical switches, and each set of optical splitters of the plurality of sets of optical splitters is coupled to a respective multiplexer of the plurality of multiplexers.

In some embodiments, a method includes forming a first cladding layer on a substrate, forming a waveguide on the first cladding layer, forming a second cladding layer on the waveguide, and connecting a plurality of waveguides including the waveguide to a plurality of optical switches and a plurality of multiplexers to form an optical interconnect.

Numerous other aspects and features are provided in accordance with these and other embodiments of the disclosure. Other features and aspects of embodiments of the disclosure will become more fully apparent from the following detailed description, the claims, and the accompanying drawings.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIGS. 5-6C are diagrams of example implementations of waveguide routing solutions within an optical interconnect, according to some embodiments.

DETAILED DESCRIPTION

Figures 1A, 1B:
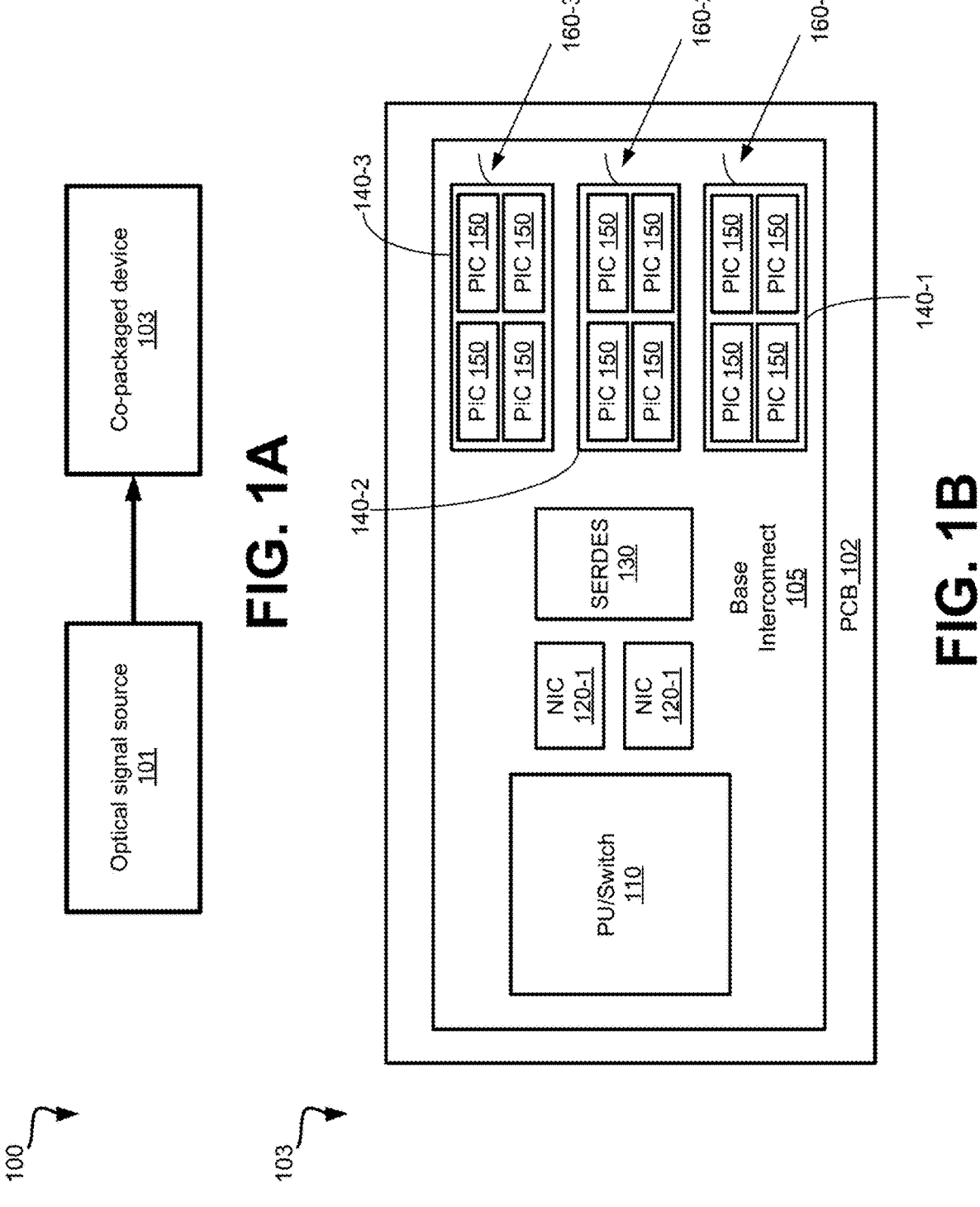
FIGS. 1A-1C are diagrams of views of example systems that implement reconfigurable optical interconnects (e.g., interposers) for co-packaged optical devices including photonic integrated circuits (PICs), according to some embodiments.

Embodiments of the present disclosure relate to reconfigurable optical interconnects (e.g., interposers) for co-packaged devices including photonic integrated circuits (PICs). A co-packaged device (e.g., multi-chip module) can include a package substrate having multiple PICs assembled closely together. More specifically, optical components can be integrated on substrates (e.g., silicon (Si) substrate) for fabricating large-scale PICs that co-exist with micro-electronic chips. With the use of an optical transceiver, a received optical signal can be converted to an electrical signal capable of being processed by an integrated circuit, or the processed electrical signal can be converted to an optical signal to be transmitted via an optical fiber.

Instead of ICs (e.g., microchips) that utilize electrons to process information, referred to as electronic ICs (EICs), a PIC utilizes photons (light particles) to process information. A PIC can include multiple photonic components connected on a single chip. Examples of components of a PIC include optical signal generators (e.g., lasers) to generate optical signals (e.g., light), waveguides to direct optical signals within the PIC (e.g., similar to wires used to direct electrons), modulators to modulate optical signals to encode information, and detectors to detect and decode the information from the optical signals. PICs can have various advantages over EICs. For example, PICs can offer high data rates due to the high speed performance capabilities of the integrated photonic components such as the optical modulator and detector. As another example, photons within PICs can experience less signal loss as compared to electrons within EICs, which enables more energy-efficient operation.

A co-packaged device can include an interconnect device ("interconnect") disposed between a first component and a second component. For example, an interconnect can be a placed between a package substrate and a ball grid array. In some embodiments, an interconnect includes an interposer. An interposer is an electrical interface that routes connections between sockets or connections between the first component and the second component. An interposer can be used to connect components that may not naturally connect to one another. Some interconnects (e.g., interposers) can include multiple conductive layers (e.g., metal layers), where pairs of conductive layers are connected by at least one conductive via ("via"). For example, a first conductive layer of a first metallization level and a second conductive layer of a second metallization level can be connected by at least one via. Some interconnects (e.g., interposers) can further include multiple waveguides integrated near the conductive layers.

The waveguides of an interconnect can use evanescent wave coupling to transmit an optical signal received from an initial waveguide of the interconnect to a final waveguide of the interconnect. For example, the initial waveguide can be integrated near a bottom conductive layer of the interconnect, and the final waveguide can be integrated near a top conductive layer of the interconnect. Evanescent wave coupling generally refers to a (quantum) tunneling phenomenon in which an evanescent wave exiting a first medium excites a wave in an adjacent medium that is sufficiently close to the first medium. For example, in an optical communication system, evanescent wave coupling can occur when an evanescent wave generated within a waveguide excites an electromagnetic wave in an adjacent waveguide. Evanescent wave coupling can be accomplished when two waveguides are positioned close together such that the evanescent field generated by one of the waveguides reaches the other waveguide before any substantial decay of the evanescent wave is experienced. Generally, an evanescent wave is an oscillating wave (e.g., electromagnetic wave or acoustic wave) generated at a boundary between two media and exists only within a very short distance from the boundary. Evanescent waves can exit the waveguide, and their amplitude can decay exponentially as a function of distance from the boundary. Thus, evanescent waves are generally observable in the near field of the optical signal in close proximity to the boundary.

An optical connection between a fiber or fiber array and the PIC optical waveguide, also referred to herein as a connector, can include a connection substrate having multiple grooves formed therein, into which multiple respective optical fibers can be inserted and secured. Each optical fiber can be optically coupled to a respective waveguide. A connection substrate can be formed with a geometry that can provide the proper spacing to achieve optical coupling (e.g., evanescent wave coupling). For example, a large number of optical fiber-to-waveguide couplings may be needed for a multichannel wavelength division multiplexing (WDM) optical system.

One type of a connection substrate is a V-groove connection substrate, which is a substrate having multiple V-grooves formed therein. A V-groove is an opening that has a tapered shape in which the sides of the groove converged to a point (e.g., triangular shape). For each V-groove, an optical fiber can be inserted into the V-groove and secured in the V-groove using an adhesive (e.g., glue).

Some edge coupling solutions utilize single-mode fiber (SMF) to waveguide edge coupling through V-grooves. More specifically, a cladding layer can have a single-mode inner core disposed therein to form a waveguide, which can be placed in a V-groove. Such implementations cannot be densely scaled up due to limitations in cladding layer diameters. Additionally, high-speed interconnects can utilize hundreds of SMFs connected to a PIC. Individually attaching SMFs can consume a large number of spatiotemporal resources.

Typically, a PIC implementing a multichannel wavelength division multiplexing (WDM) system includes active components such as modulators, multiplexers, etc. For example, a given modulator can receive an optical signal from an optical signal source, and generate a modulated wave. A set of modulated waves generated from a set of optical signals can be combined using a respective multiplexer to generate a multiplexed wave for a given channel. Such one-to-one optical fiber-to-waveguide connections can require a large number of optical fiber-to-waveguide couplings for a multichannel WDM system. For example, the number of couplings can be n*m, where n is the number of optical signal sources (e.g., light sources) and m is the number of channels of the multichannel WDM system. Accordingly, it can be difficult to scale up the number of channels in an optical system.

Aspects and implementations described herein can address these and other drawbacks by implementing reconfigurable interconnects for co-packaged devices including PICs. A system described herein can include a set of PICs disposed on an (optical) interconnect. For example, the interconnect can include an interposer. An interconnect described herein can include a combination of tunable components and fixed components. An interconnect architecture described herein can be reconfigurable through the number of input wavelengths of optical signals, as well as the number of PICs.

For example, an interconnect can include a set of optical switches. Each optical switch is configured to receive a respective wavelength of an optical signal (e.g., light) from an optical signal source. For example, if there are n wavelengths, then there are n optical switches of the set of optical switches. In some embodiments, an optical switch includes at least one interferometer.

For example, an optical switch can be implemented using a Mach-Zehnder interferometer (MZI). An MZI is an interferometer that leverages the electro-optic effect, in which a change in the refractive index of a material is induced by an applied electric field, to create an interference pattern that can be modulated to encode information onto an optical signal.

An MZI can include an input section to receive an input optical signal, and split the optical signal into a first optical signal and a second optical signal. An MZI can further include a pair of arm waveguides. A first arm waveguide can receive the first optical signal from the input section and a second arm waveguide can receive the second optical signal from the input section. The first and second arm waveguides of the MZI can be formed from a material that exhibits strong electro-optic effect, such as lithium niobate ($LiNbO_3$), gallium arsenide (GaAs), indium phosphide (InP), etc., or strong thermo-optic effect such as silicon (Si) or silicon carbide (SiC). An MZI can further include an output section that generates at least one output optical signal based on the optical signals received from the first and second arm waveguides. More specifically, the output section generates at least one output optical signal as a function of the phase difference between the first optical signal received from the first arm waveguide and the second optical signal received from the second arm waveguide.

In some implementations, an optical switch is implemented using a balanced MZI in which the first arm waveguide has an approximately similar geometry (e.g., approximately similar length) to the second arm waveguide. In some implementations, an optical switch is implemented using an unbalanced MZI in which the first arm waveguide is a delay arm waveguide, and the second arm waveguide is a non-delay arm waveguide. The delay arm waveguide has a geometry, different from the non-delay arm waveguide, that causes a delay in the optical signal traveling through the delay arm waveguide relative to the optical signal traveling through the non-delay arm waveguide. More specifically, the delay arm waveguide can be longer than the non-delay arm waveguide.

In some embodiments, an optical switch includes a ring-assisted interferometer (e.g., a ring-assisted MZI or RAMZI), where at least one ring waveguide is integrated with an interferometer. A ring waveguide is a waveguide in the shape of a closed loop having an associated resonant frequency. In some embodiments, a ring-assisted interferometer includes multiple ring waveguides (e.g., a first ring waveguide corresponding to a first arm waveguide of an MZI and a second ring waveguide operatively coupled to a second arm waveguide of the MZI).

An optical switch implementing a ring-assisted interferometer can be tuned by tuning the least one ring waveguide. In some embodiments, tuning a ring waveguide includes performing thermal tuning using at least one heater operatively coupled to the ring waveguide. For example, a heater can include a set of heater pads connected to a wire. The heat generated by a heater operatively coupled to a ring waveguide can adjust the thermal properties of the material of the ring waveguide, which can modify the resonant wavelength of the ring waveguide and thus the response of the ring waveguide with respect to the optical wavelength. For example, adjusting properties of the ring waveguide can include adjusting voltages of the heater operatively coupled to the ring waveguide. A heater described herein can be formed of any suitable material (e.g., to ensure a high current threshold for electromigration and/or heat generation versus bias (resistance)). For example, a heater described herein can include a tungsten (W) material, such as W or titanium nitride (TiN). The number of ring waveguides used in a RAMZI can be minimized due to the heaters used for the ring tuning (e.g., to manage the overall power dissipation of the interconnect to maintain any set configuration).

An interconnect can further include a set of multiplexers. Each optical switch can be coupled to each multiplexer of the set of multiplexers. In some embodiments, a multiplexer further operates as a power splitter. In some embodiments, a multiplexer can be a multi-stage multiplexer. A multiplexer described herein can have a broadband design, with minimal change in optical split ratio across the wavelength range of operation. Illustratively, the set of multiplexers can include three multiplexers, including an n×2 multiplexer, an n×4 multiplexer and an n×8 multiplexer. However, such an example should not be considered limiting. In some embodiments, the set of multiplexers is implemented by a set of multimode interferometers (MMIs). An MMI is also referred to as a multimode interference coupler. In some embodiments, the set of multiplexers is implemented by a set of arrayed waveguide gratings (AWGs) or ring interleavers.

In some embodiments, an optical switch is implemented as a 1×k optical switch, where 1 refers to the single optical signal input and k is the number of multiplexers of the set of multiplexers, and each input of a multiplexer of the set of multiplexers is coupled to a respective output of the 1×k optical switch. For example, a 1×k optical switch can be implemented as a multi-stage interferometer that includes a combination of interferometers (e.g., ring-assisted interferometers), where each input of a multiplexer is coupled to a respective output of the multi-stage interferometer. Illustratively, if the set of multiplexers includes three multiplexers (e.g., an n×2 multiplexer, an n×4 multiplexer and an n×8 multiplexer), then a 2-stage interferometer can be used in which a first output of a first interferometer can be operatively coupled to an input of a second interferometer, a second output of the first interferometer can be coupled to a first multiplexer of the set of multiplexers, a first output of the second interferometer can be coupled to a second multiplexer of the set of multiplexers, and a second output of the second interferometer can be coupled to a third multiplexer of the set of multiplexers.

Each output of a multiplexer of the set of multiplexers can be coupled to a respective optical splitter. Each optical splitter can send optical signals to a designated PIC. More specifically, an optical splitter can be a 1×m optical splitter, where m is the number of waveguides of the PIC. Illustratively, for an n×2 multiplexer, a first optical splitter can be coupled to a first output of the n×2 multiplexer and a second optical splitter can be coupled to a second output of the n×2 multiplexer. For an n×4 multiplexer, a first optical splitter can be coupled to a first output of the n×4 multiplexer, a second optical splitter can be coupled to a second output of the n×4 MMI, a third optical splitter can be coupled to a third output of the n×4 multiplexer, and a fourth optical splitter can be coupled to a fourth output of the n×4 multiplexer.

An interconnect described herein can include sets of waveguides arranged to transmit an optical signal from the interconnect to respective PICs disposed on the interconnect via evanescent coupling. For example, a first set of waveguides can transmit an optical signal from the interconnect to a first PIC, a second set of waveguides can transmit an optical signal from the interconnect to a second PIC, etc. In some embodiments, each set of waveguides is arranged having a staircase geometry to enable evanescent coupling to transmit an optical signal from the interconnect to the PIC.

The reconfigurability of an interconnect can be achieved by using optical switching to switch between different configurations. More specifically, a configuration refers to number of PICs accessed, the wavelengths that are routed to those PICs, and the power level of the individually routed wavelengths. As an illustrative example, assume that there are four PICs formed on an interconnect including two optical switches (e.g., RAMZIs). A first optical switch can be configured route a first wavelength to all four of the PICs, and a second optical switch can be configured to route a second wavelength to two of the PICs. In this illustrative example, two PICs would have two wavelengths routed to them, while the other two PICs would only have 1 wavelength routed to them. A nominal configuration would be to have all wavelengths be routed to all four PICs via each of the optical switches. For example, if the optical switch includes a RAMZI, then the optical switch can be controlled through the ring resonators of the RAMZI. These ring resonators can be controlled by tuning using voltage controlled ring heaters that are integrated with the ring resonators.

To ensure proper functionality of an interconnect described herein, wafer-level screening could be achieved by integrating a low-percentage tap or directional coupler to waveguides meant for evanescent coupling to the PICs. These taps can be connected to components that can enable wafer-level screening, such as grating couplers.

Embodiments described herein can provide for waveguide routing solutions that can enable dense waveguide routing in a substrate in a manner that reduces (e.g., eliminates) interference. In some embodiments, a waveguide routing solution is a two-dimensional (2D) waveguide routing solution.

In some embodiments, a waveguide routing solution is a three-dimensional (3D) waveguide routing solution. A 3D waveguide routing solution can route an optical signal from a first waveguide in a first layer to a second waveguide in a second layer (e.g., above the first layer). For example, a 3D waveguide routing solution can be an evanescent coupling 3D waveguide routing solution. In this example, an optical signal from the first waveguide can be routed to the second waveguide using evanescent coupling.

As another example, a 3D waveguide routing solution can be a through via 3D waveguide routing solution. In this example, an optical signal from the first waveguide can be routed from the first waveguide to the second waveguide using a through via (e.g., through glass via (TGV) or a through silicon vias (TSV)). More specifically, a set of routing elements within the through via can be used to route the optical signal from the first waveguide to the second waveguide. For example, the set of routing elements can include a vertical waveguide, a set of optical elements (e.g., microlens, mirrors, meta-surfaces), etc.

As yet another example, a 3D waveguide routing solution can be a direct waveguide writing 3D waveguide routing solution. In this example, an optical signal generator (e.g., laser) can generate optical signals that can directly write waveguides inside of a substrate.

Embodiments described herein can implement multicore single-mode fiber (MC-SMF) to waveguide array edge coupling. An MC-SMF described herein can be connected to multiple standard SMFs with appropriate connector for standard product connection.

For example, a device described herein can include a substrate having multiple grooves (e.g., V-grooves) formed therein. The substrate can further include multiple sets of waveguides. Each set of waveguides can correspond to a respective groove of the substrate. In some embodiments, a pitch corresponding to the distance between adjacent grooves (e.g., distance between points of adjacent V-grooves) ranges between about 100 micrometers (μm) to about 150 μm. In some embodiments, the pitch is about 127 μm. Each groove can receive a respective MC-SMF optical fiber, which can be secured with an adhesive (e.g., glue). An MC-SMF optical fiber can include a cladding layer and multiple inner cores disposed within the cladding layer. Each inner core of an MC-SMF optical fiber disposed in a groove can be optically coupled to a respective waveguide of the corresponding set of waveguides formed within the substrate.

Inner cores can be arranged within a cladding layer using any suitable configuration or geometry. In some embodiments, a cladding layer has a diameter that ranges between about 100 μm to about 150 μm. In some embodiments, a cladding layer has a diameter of about 125 μm.

In some embodiments, inner cores are arranged within a cladding layer in an approximately linear configuration. In some embodiments, an inner core has a diameter that ranges between about 6 μm to about 10 μm. In some embodiments, an inner core has a diameter of about 8 μm. In some embodiments, a distance between each inner core ranges between about 15 μm to about 25 μm. In some embodiments, a distance between each inner core is about 20 μm.

In some embodiments, inner cores are arranged within a cladding layer in a non-linear configuration. For example, the non-linear configuration can have a hexagonal cross-sectional shape. The number of inner cores that can be included in a cladding layer can depend at least in part on the diameter of the cladding layer. In some embodiments, an inner core has a diameter that ranges between about 6 μm to about 10 μm. In some embodiments, an inner core has a diameter of about 8 μm.

In some embodiments, a device includes multiple substrates bonded together (e.g., vertically). More specifically, each substrate can include MC-SMF optical fibers formed in respective grooves, where each MC-SMF optical fiber includes multiple inner cores optically coupled to respective waveguides of a set of waveguides corresponding to the respective groove, similar to the substrate described above. In some embodiments, inner cores are arranged within a cladding layer in a linear configuration. In some embodiments, inner cores are arranged within a cladding layer in a non-linear configuration. For example, the non-linear configuration can have a hexagonal cross-sectional shape. Waveguides from one substrate can be routed to waveguides of another substrate using vias (e.g., through-glass vias (TGVs)), using techniques such as photonic wire bounding, meta-lens, etc.

Embodiments described herein can provide for numerous other technical advantages. For example, embodiments described herein can reduce evanescent wave decay within devices (e.g., interconnects), which can improve the ability of waveguides of these devices to transmit optical signals. Embodiments described herein can reduce the size of a PIC, which can reduce costs, and enable more PICs to be used per area on the interconnect to increase the area bandwidth density.

FIG. 1A is a block diagram of system 100, according to some embodiments, As shown, the system 100 can include optical signal source 101 and co-packaged device 103. Optical signal source 101 can provide, as input to co-packaged device, multiple wavelengths of optical signals (e.g., multiple wavelengths of light). For example, optical signal source 101 can include multiple optical signal generators (e.g., lasers) that each generate a respective wavelength of an optical signal. An example of co-packaged device 103 will now be described below with reference to FIGS. 1B-1C.

Figure 1C:
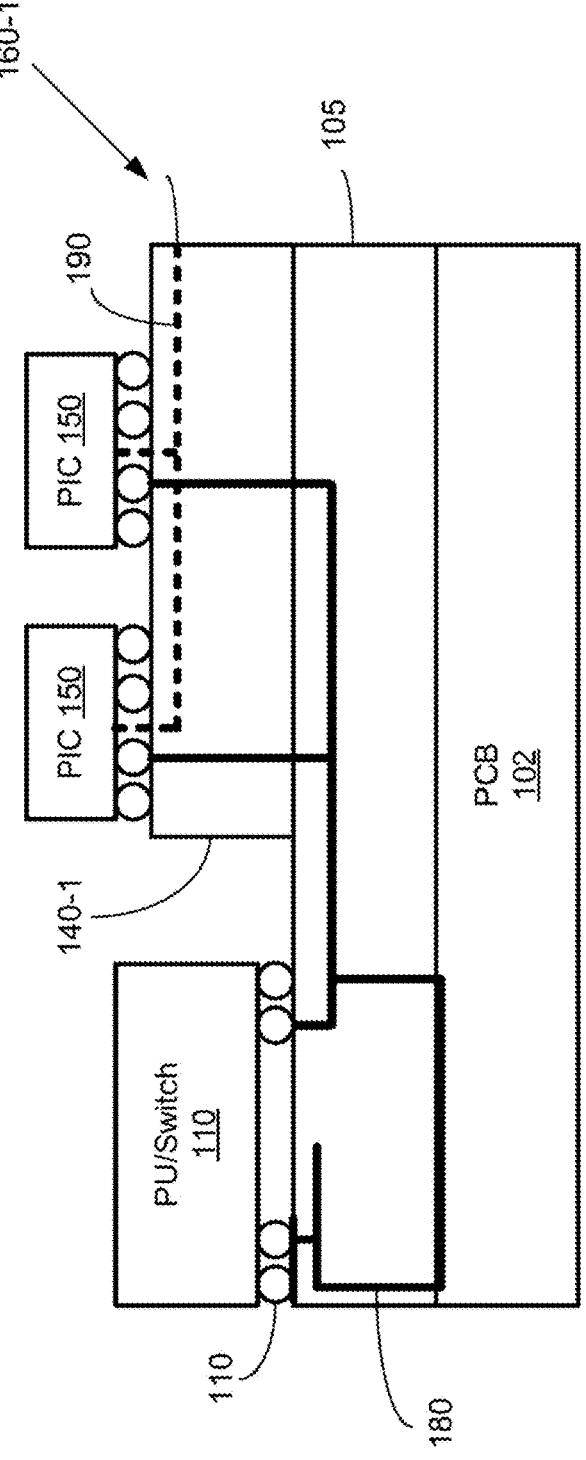

FIGS. 1B-1C are block diagrams of views of co-packaged device 103, according to some embodiments. More specifically, FIG. 1B is a top-down view of co-packaged device 103, and FIG. 1C is a side view of co-packaged device 103.

As shown in FIG. 1B, co-packaged device 103 can include printed circuit board (PCB) 102, base interconnect (e.g., interposer) 105, at least one processing unit and/or switch (PU/switch) 110 disposed on base interconnect 105, at least one network interface card (NIC) 120 disposed on base interconnect 105, serializer-deserializer (SERDES) 130 disposed on base interconnect 105, multiple interconnects 140-1 through 140-3 disposed on base interconnect 105, multiple photonic integrated circuits (PICs) 150 disposed on each of interconnects 140-1 through 140-3, and multiple waveguides 160-1 through 160-3 each coupled to a respective one of interconnects 140-1 through 140-3. In some embodiments, and as shown, the number of interconnects is three. However, the number of interconnects should not be considered limiting. In some embodiments, and as shown, each set of PICs 750s includes four PICs. However, the number of PICs should not be considered limiting.

More specifically, each of interconnects 140-1 through 140-3 can be disposed between respective sets of PICs 150 and base interconnect 105. For example, as further shown in FIG. 1C, bumps 170 are disposed between PU/Switch 110 and base interconnect 105, and between PICs 150 and interconnects 140-1 through 140-3. Conductive wires 180 can be formed through the base interconnect 105 and the interconnects 140-1 through 140-3 to enable electrical connections between components of co-packaged device 103 (e.g., PU/switch 110 and PICs 150). Additionally, through each of interconnects 140-1 through 140-3, a respective waveguide system 180 can be formed to provide optical signals to the PICs 150.

Figure 2A:
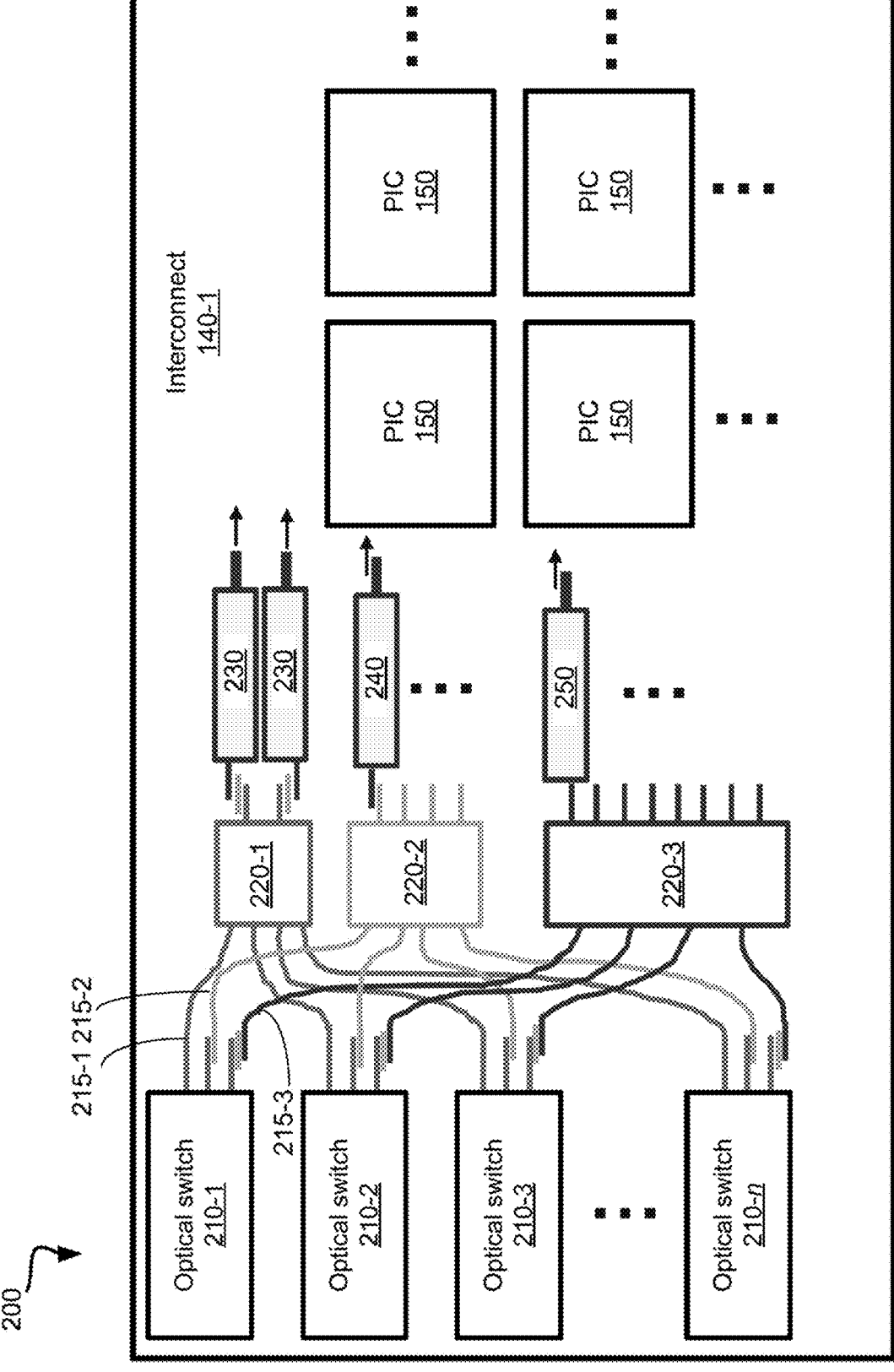
FIGS. 2A-3C are diagrams of example implementations of systems that implement reconfigurable optical interconnects (e.g., interposers) for co-packaged optical devices including photonic integrated circuits (PICs), according to some embodiments.
Figures 2B, 2C:
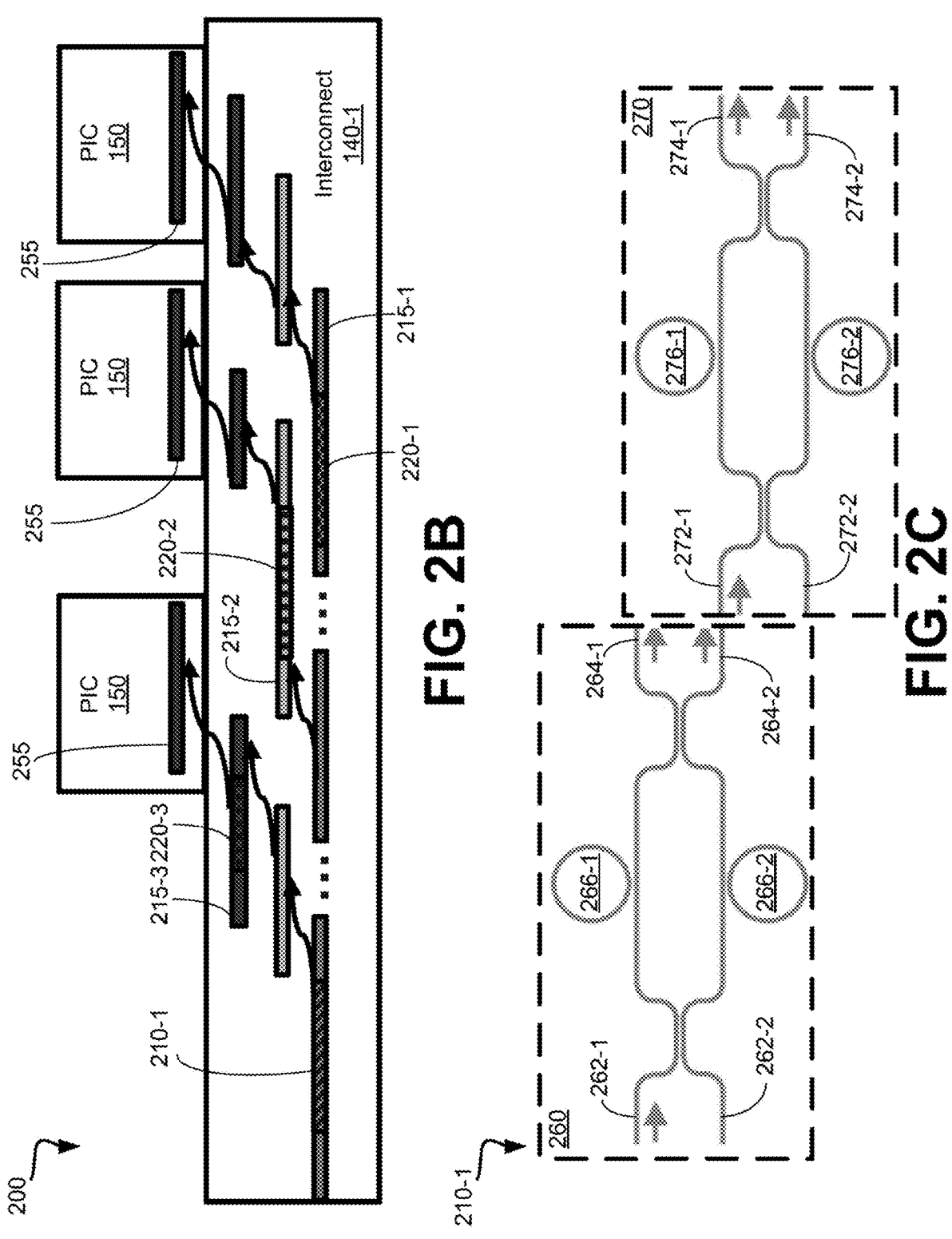

FIGS. 2A-2B are diagrams of an example system 200, according to some embodiments. More specifically, FIG. 2A is a top-down view of system 200, and FIG. 2B is a cross-sectional view of system 200. As shown in FIG. 2A, system 200 includes interconnect 140-1 and PICs 150 of FIGS. 1B-1C.

Interconnect 140-1 can include optical switches 210-1 through 210-n. Each of optical switches 210-1 through 210-n is configured to receive a respective wavelength of an optical signal (e.g., light) from an optical signal source (e.g., optical signal source 101 of FIG. 1A). For example, since there are n optical switches, there are n wavelengths. In some embodiments, at least one of optical switches 210-1 through 210-n includes at least one interferometer. For example, at least one of optical switches 210-1 through 210-n can include an MZI. In some embodiments, an optical switch includes a ring-assisted interferometer (e.g., a RAMZI). In these embodiments, the optical switch can be tuned using the ring waveguide. The number of ring resonators used in a RAMZI can be minimized due to the ring heaters used for the ring tuning (e.g., to manage the overall power dissipation of the interconnect to maintain any set configuration). A ring heater described herein can be formed of any suitable material (e.g., to ensure a high current threshold for electromigration). For example, a ring heater described herein can include a tungsten material, such as W or TiN.

Interconnect 140-1 can further include multiplexers 220-1 through 220-3 to generate respective multiplexed optical signals. For example, multiplexer 220-1 can be an n×2 multiplexer, multiplexer 220-2 can be an n×4 multiplexer, and multiplexer 220-3 can be an n×8 multiplexer. Although three multiplexers are shown in this example, the number of multiplexers should not be considered limiting. Each of the optical switches 210-1 through 210-n can be coupled to each multiplexer of the set of multiplexers 220-1 through 220-3. For example, a first waveguide can be coupled to an optical switch and multiplexer 220-1 (e.g., waveguide 215-1 coupled to optical switch 210-1 and multiplexer 220-1. A second waveguide can be coupled to an optical switch and multiplexer 220-2 (e.g., waveguide 215-2 coupled to optical switch 210-1 and multiplexer 220-2). A third waveguide can be coupled to an optical switch and multiplexer 220-3 (e.g., waveguide 215-3 coupled to optical switch 210-1 and multiplexer 220-2). In some embodiments, multiplexers 220-1 through 220-3 further operate as a power splitter. In some embodiments, multiplexers 220-1 through 220-3 are multistage multiplexers. Multiplexers 220-1 through 220-3 can have a broadband design, with minimal change in optical split ratio across the wavelength range of operation. In some embodiments, multiplexers 220-1 through 220-3 are implemented by respective MMIs. In some embodiments, multiplexers 220-1 through 220-3 are implemented by respective AWGs. In some embodiments, multiplexers 220-1 through 220-3 are implemented by respective ring interleavers.

In some embodiments, each of the optical switches 210-1 through 210-n is implemented as a 1×k optical switch, where 1 refers to the single optical signal input and k is the number of multiplexers, and each input of a multiplexer of the multiplexers 220-1 through 220-3 is coupled to a respective output of the 1×k optical switch. For example, a 1×k optical switch can be implemented as a multi-stage interferometer that includes a combination of interferometers (e.g., ring-assisted interferometers), where each input of a multiplexer is coupled to a respective output of the multi-stage interferometer. In this example, where there are three multiplexers 220-1 through 220-3 (e.g., an n×2 MMI, an n×4 MMI and an n×8 MMI), each of the optical switches 210-1 through 210-n can implement a 2-stage interferometer in which a first output of a first interferometer can be operatively coupled to an input of a second interferometer, a second output of the first interferometer can be coupled to a first multiplexers of multiplexers 220-1 through 220-3, a first output of the second interferometer can be coupled to a second multiplexers of multiplexers 220-1 through 220-3, and a second output of the second interferometer can be coupled to a third MMI of multiplexers 220-1 through 220-3. An illustrative example of a 2-stage interferometer will now be described below with reference to FIG. 2C.

FIG. 2C is a diagram of an example optical switch 210-1, according to some embodiments. In these embodiments, optical switch 210-1 is implemented as a multi-stage RAMZI including RAMZI component 260 and RAMZI component 270. For example, optical switch 210-1 can be a two-stage RAMZI. However, such an example should not be considered limiting.

As shown in FIG. 2C, RAMZI component 260 can include a first arm waveguide having input section 262-1 and output section 264-1, a second arm waveguide having input section 262-2 and output section 264-2, ring waveguide 266-1 and ring waveguide 266-2. RAMZI component 270 includes a first arm waveguide having input section 272-1 and output section 274-1, a second arm waveguide having input section 272-2 and output section 274-2, ring waveguide 276-1 and ring waveguide 276-2. More specifically, output section 264-2 is coupled to input section 272-1. Output section 264-1, output section 274-1 and output section 274-2 can each be coupled to a respective multiplexer of a set of multiplexers (e.g., multiplexers 220-1 through 220-3 of FIG. 2A). For example, output section 264-1 can be coupled to multiplexer 220-1 of FIG. 2A, output section 274-1 can be coupled to multiplexer 220-2 of FIG. 2A and output section 274-2 can be coupled to multiplexer 220-3 of FIG. 2A.

Referring back to FIGS. 2A-2B, interconnect 140-1 can further include sets of optical splitters 230 through 250, where each of the outputs of the multiplexers 210-1 through 210-n can be coupled to a respective optical splitter of a respective set of optical splitters. More specifically, each optical splitter can split a multiplexed optical signal received from a multiplexer into multiple split optical signals. For example, set of optical splitters 230 can be coupled to multiplexer 220-1, set of optical splitters 240 can be coupled to multiplexer 220-2, and set of optical splitters 250 can be coupled to multiplexer 220-3. Each of the optical splitters can send optical signals to a designated PIC 150. More specifically, an optical splitter can be a 1×m optical splitter, where m is the number of waveguides of the PIC 150. Illustratively, if multiplexer 220-1 is an n×2 multiplexer, then set of optical splitters 230 includes 2 optical splitters each coupled to a respective output of multiplexer 220-1. If multiplexer 220-2 is an n×4 multiplexer, then set of optical splitters 240 include 4 optical splitters each coupled to a respective output of multiplexer 220-2. If multiplexer 220-3 is an n×8 multiplexer, then set of optical splitters 250 includes 5 optical splitters each coupled to a respective output of multiplexer 220-3.

As shown in FIG. 2B, interconnect 140-1 can transmit optical signals to respective PICs 150 via evanescent coupling. More specifically, as shown in FIG. 2B, each of PICs 150 can include waveguide 255 to receive an optical signal. For example, a first set of waveguides can transmit an optical signal from the interconnect to a first PIC, a second set of waveguides can transmit an optical signal from the interconnect to a second PIC, etc. In some embodiments, each set of waveguides is arranged having a staircase geometry to enable evanescent coupling to transmit an optical signal from the interconnect to the PIC.

Figure 3A:
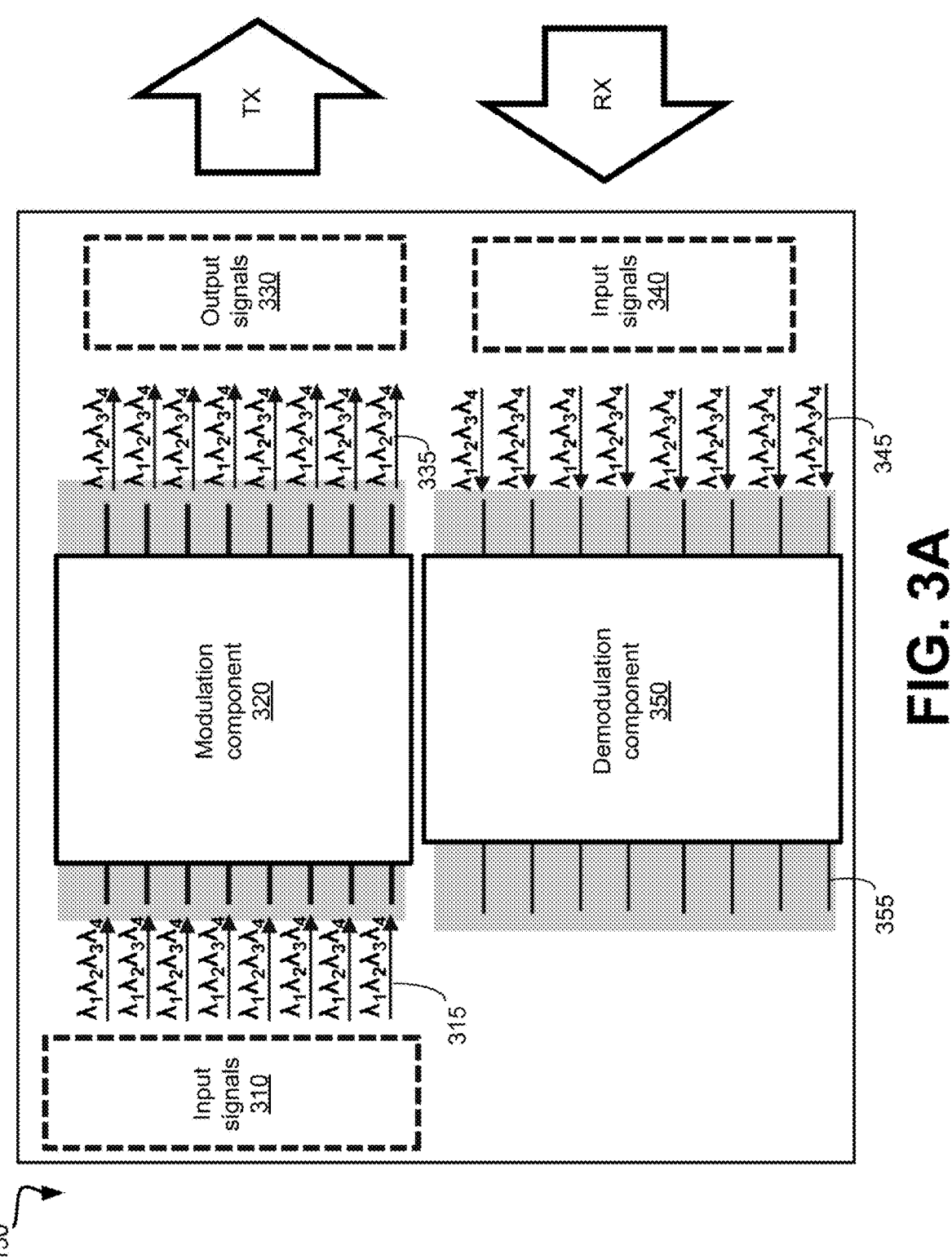

FIG. 3A is a diagram of an example PIC 150, according to some embodiments. As shown in FIG. 3A, input signals 310 can be received by modulation component 320 of PIC 150. Input signals 310 can be received from optical splitters of an interconnect on which the PIC 150 is formed (e.g., interconnect 140-1 of FIG. 2A). More specifically, modulation component 320 is coupled to a first set of input waveguides including input waveguide 315, where each input waveguide of the first set of input waveguides transmits a respective set of wavelengths to modulation component 320. The set of wavelengths received by modulation component 320 is represented by $\lambda_1$ through $\lambda_4$. Although four wavelengths are shown in this illustrative example, the number of wavelengths should not be considered limiting.

Modulation component 320 can modulate input signals 310 to generate modulated output signals ("output signals") 330. More specifically, modulation component 320 is coupled to a first set of output waveguides including output waveguide 335, where each output waveguide of the first set of output waveguides transmits a respective set of wavelengths of a modulated optical signal out of PIC 150 through an optical coupling (e.g., of the interconnect). The set of wavelengths output by modulation component is represented by $\lambda_1$ through $\lambda_4$. Although four wavelengths are shown in this illustrative example, the number of wavelengths should not be considered limiting. In some embodiments, and as will be described in further detail below with reference to FIG. 3B, modulation component 320 can be implemented using multiple ring waveguide components.

As further shown in FIG. 3A, input signals 340 can be received by demodulation component 350 of PIC 150. Input signals 340 can be received from the optical coupling. More specifically, demodulation component 350 is coupled to a second set of input waveguides including input waveguide 345, where each input waveguide of the second set of input waveguides transmits a respective set of wavelengths to demodulation component 350. The set of wavelengths received by demodulation component 350 is represented by $\lambda_1$ through $\lambda_4$. Although four wavelengths are shown in this illustrative example, the number of wavelengths should not be considered limiting. Demodulation component 350 can demodulate input signals 340 to generate demodulated output signals ("output signals"). More specifically, demodulation component 350 is coupled to a second set of output waveguides including output waveguide 355. In some embodiments, and as will be described in further detail below with reference to FIG. 3C, demodulation component 350 can be implemented using multiple ring waveguide components.

FIG. 3B is a diagram of an example modulation component 320, according to some embodiments. As shown in FIG. 3B, modulation component 320 includes ring waveguide components including ring waveguide component 322. Each ring waveguide component has a waveguide coupled to a respective input waveguide of the set of input waveguides and a respective output waveguide of a set of output waveguides. For example, ring waveguide component 322 has a waveguide that is coupled to input waveguide 315 and output waveguide 335.

Each ring waveguide component includes a set of waveguides to modulate the set of wavelengths by ki through $\lambda_4$ received via the set of input waveguides (e.g., input waveguide 315). For example, ring waveguide component 322 includes a set of waveguides including waveguides 324-1 through 324-4. The number of ring waveguides of ring waveguide component 322 can be equal to the number of wavelengths received via input waveguide 315. More specifically, each ring waveguide of a set of ring waveguides is tuned to receive a respective wavelength of the set of wavelengths ki through $\lambda_4$ received via the set of input waveguides.

FIG. 3C is a diagram of an example demodulation component 350, according to some embodiments. As shown in FIG. 3C, demodulation component 350 includes ring waveguide components including ring waveguide component 352. Each ring waveguide component has a waveguide coupled to a respective input waveguide of a set of input waveguides and a respective output waveguide of a set of output waveguides. For example, ring waveguide component 352 has a waveguide that is coupled to input waveguide 345 and output waveguide 355 (output waveguide 355 is not shown in FIG. 3C).

Each ring waveguide component includes a set of waveguides to demodulate the set of wavelengths by $\lambda_1$ through $\lambda_4$ received via the set of input waveguides (e.g., input waveguide 345). For example, ring waveguide component 352 includes a set of waveguides including waveguides 354-1 through 354-4. More specifically, each of the waves 354-1 through 354-4 includes a ring waveguide coupled to a respective photodetector (e.g., photodetector 356). The number of ring waveguides of ring waveguide component 352 can be equal to the number of wavelengths received via input waveguide 345. More specifically, each ring waveguide of a set of ring waveguides is tuned to receive a respective wavelength of the set of wavelengths $\lambda_1$ through $\lambda_4$ received via the set of input waveguides.

Figure 1C:
Figures 4A, 4B:
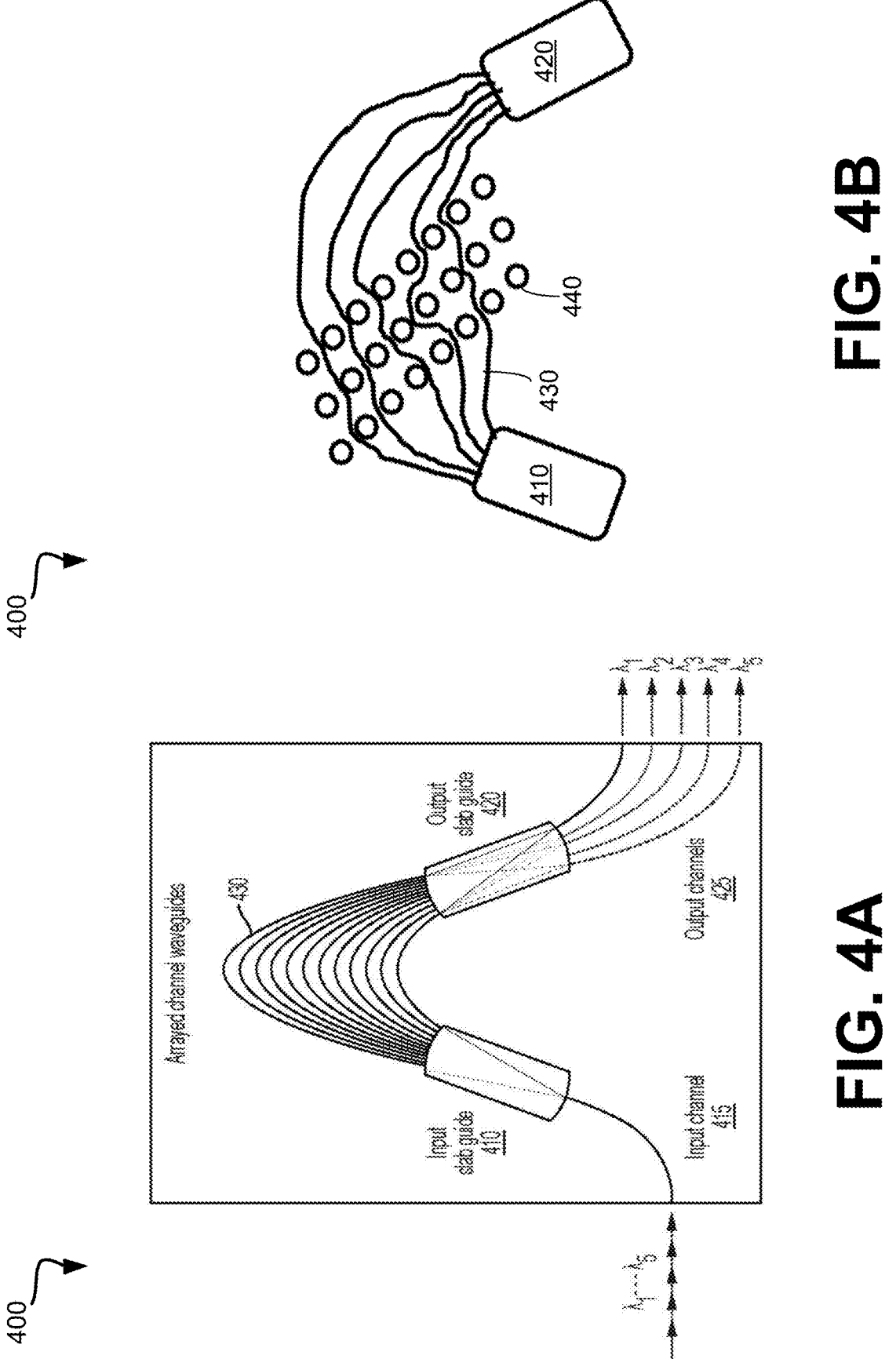
FIGS. 4A-4B are diagrams of example implementations of arrayed channel waveguides that can be implemented within an optical interconnect, according to some embodiments.

FIGS. 4A-4B are diagrams of an example device 400, according to some embodiments. In some embodiments, device 400 is an interconnect (e.g., interconnect 140-1 of FIGS. 1-2C). Device 400 can include input slab guide 410, output slab guide 420, and a set of arrayed channel waveguides 430. Device 400 can include input channel 415 to receive input optical signals within a single optical fiber. Device 400 can include output channels 425. Each channel 425 corresponds to a respective output optical signal. In some embodiments, as shown in FIG. 4B, device 400 includes multiple through vias 440, and the arrayed channel waveguides 430 are routed around through vias 440.

Figures 5, 6A:
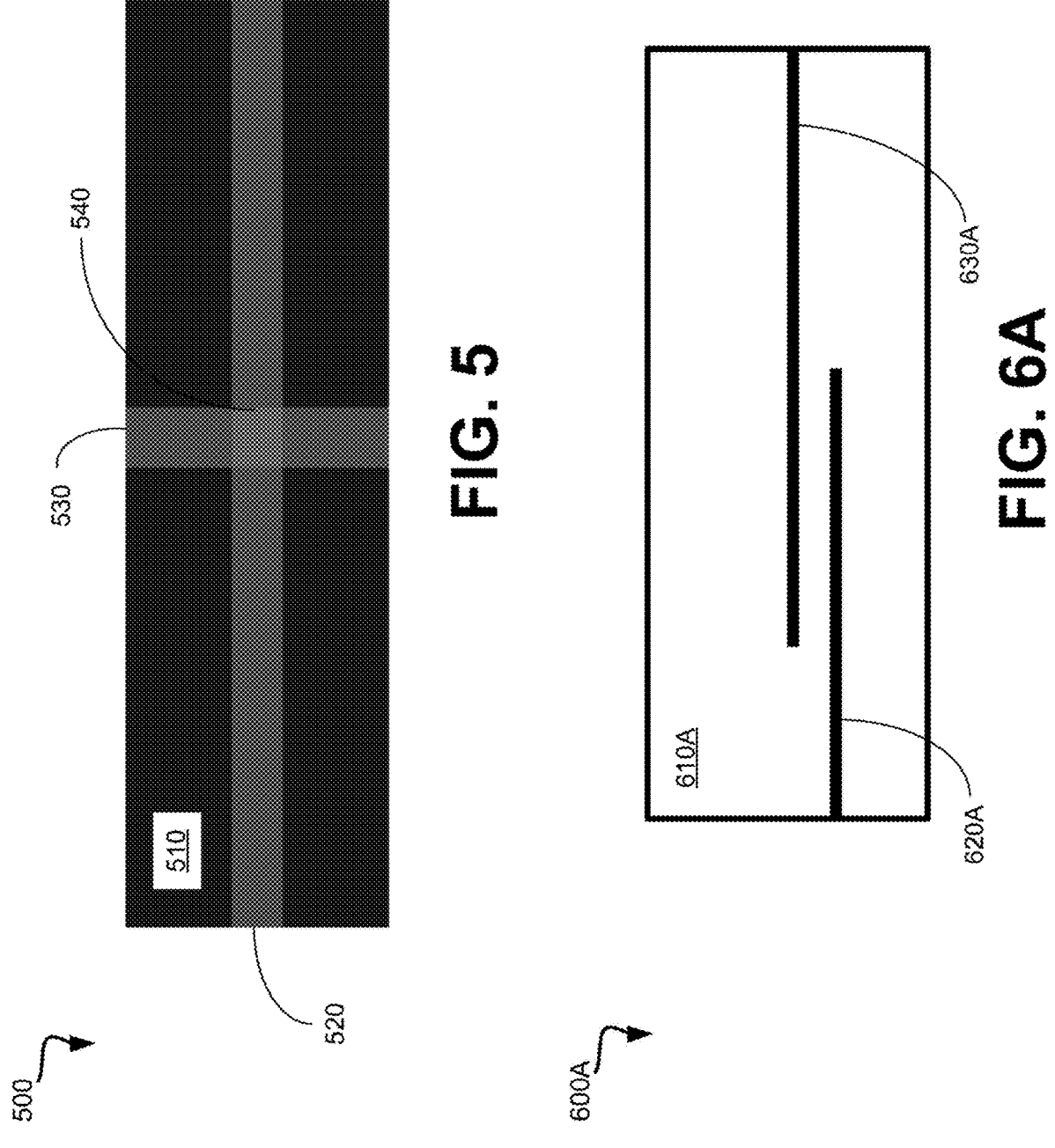

FIG. 5 is a diagram of a system 500 including a device implementing a 2D waveguide routing solution. More specifically, the device can include substrate 510 including waveguides 520 and 530 formed therein. Waveguides 520 and 530 can be formed on the same level and can cross at intersection 540. Insertion loss and cross-talk can be reduced to a sufficiently low amount by fine tuning the crossing dimensions.

FIG. 6A is a diagram of a system 600A including a device implementing evanescent coupling 3D waveguide routing. More specifically, the device can include substrate 610A including waveguides 620A and 630A formed therein. Waveguide 620A corresponds to a first level and waveguide 630A corresponds to a second level above the first level.

Evanescent coupling can be used to transmit an optical signal from waveguide 620A to waveguide 630A (or vice versa).

Figures 6B, 6C:
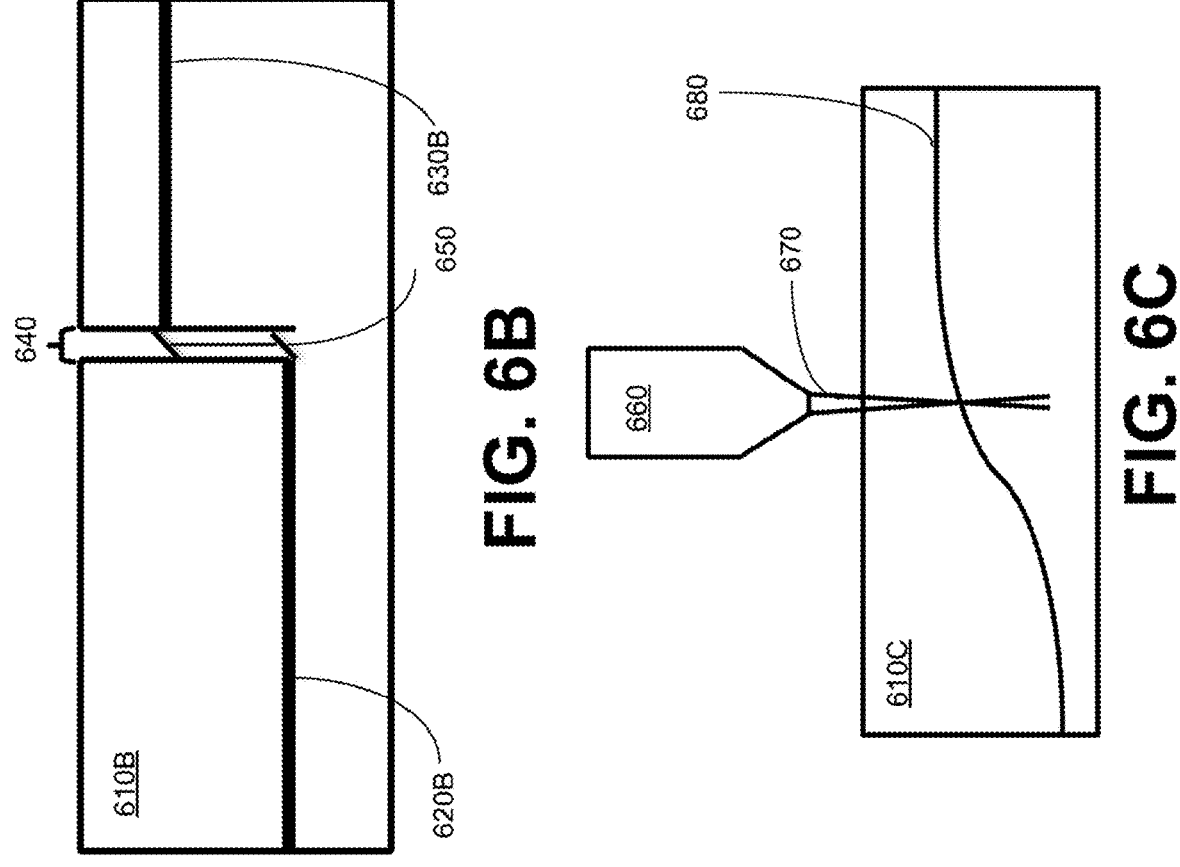

FIG. 6B is a diagram of a system 600B including a device implementing through via 3D waveguide routing. More specifically, the device can include substrate 610B including waveguides 620B and 630B formed therein. Waveguide 620B corresponds to a first level and waveguide 630B corresponds to a second level above the first level. The device can further include through via 640 formed within substrate 610B, and a set of routing elements 650 disposed within through via 640. An optical signal can be routed from waveguide 620B to waveguide 630B (or vice versa) using set of routing elements 650. For example, set of routing elements 650 can include a vertical waveguide, a set of optical elements (e.g., microlens, mirrors, meta-surfaces), etc.

FIG. 6C is a diagram of a system 600C including a device implementing direct waveguide writing 3D waveguide routing. More specifically, the device can include substrate 610C. System 600C can include optical signal generator (e.g., laser) 660 that can generate optical signal (e.g., laser beam) 670 that can directly write waveguide 680 inside of substrate 610C. Waveguide 680 can traverse a first level and a second level (e.g., similar to the first and second levels of FIGS. 6A-6B) to enable 3D waveguide routing.

Figure 7A:
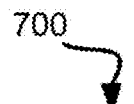
FIGS. 7A-7B are flowcharts of example methods to implement reconfigurable optical interconnects (e.g., interposers) for co-packaged optical devices including photonic integrated circuits (PICs), according to some embodiments.
Figure 7A:
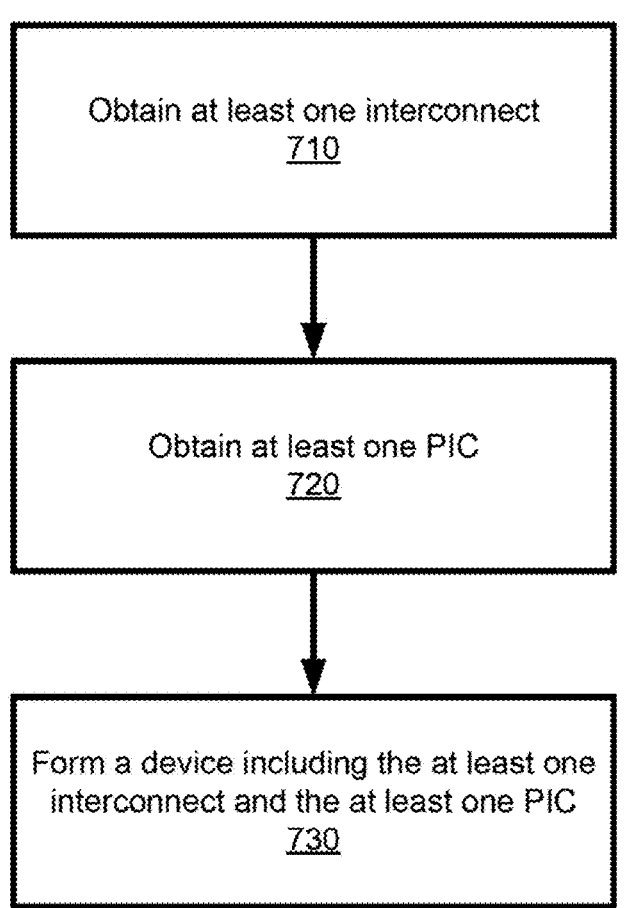

FIG. 7A is a flowchart of a method to implement a reconfigurable optical interconnect (e.g., interposer) for a co-packaged optical device including a PIC, according to some embodiments.

At block 710, at least one interconnect is obtained. For example, the at least one interconnect can be similar to interconnect 140-1 of FIGS. 1-3. In some embodiments, obtaining the at least one interconnect includes receiving the at least one interconnect. In some embodiments, obtaining the at least one interconnect includes forming the at least one interconnect. Further details regarding forming the at least one interconnect are described above with reference to FIGS. 2A-6C and will be described below with reference to FIG. 7B

At block 720, at least one PIC is obtained. For example, the at least one PIC can be similar to PIC 150 of FIGS. 1-3. In some embodiments, obtaining the at least one PIC includes forming the at least one PIC. In some embodiments, obtaining the at least one PIC includes receiving the at least one PIC.

At block 730, a device including the at least one interconnect and the at least one PIC is formed. For example, the device can include a PCB (e.g., PCB 102 of FIGS. 1A-1B), a base interconnect formed on the PCB (e.g., base interconnect 105 of FIGS. 1A-1B), the at least one interconnect formed on the base interconnect, and the at least one PIC formed on the at least one interconnect. For example, a ball grid array can be disposed between the at least one interconnect and the at least one PI6C.

Figure 7B:
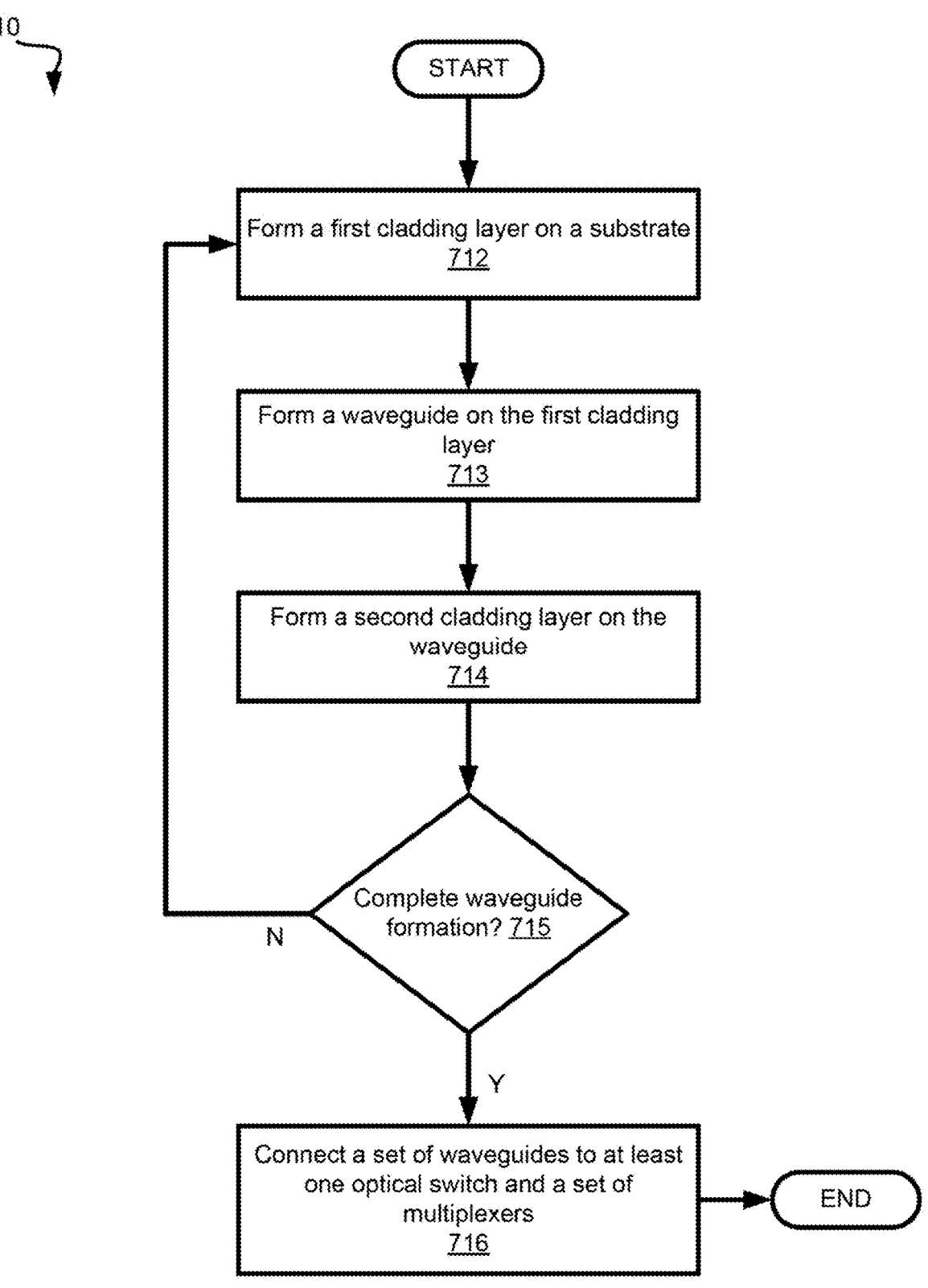

FIG. 7B is a flowchart of a method to form a reconfigurable optical interconnect (e.g., interposers) for co-packaged optical devices including photonic integrated circuits (PICs), according to some embodiments.

At block 712, a first cladding layer is formed on a substrate. For example, the first cladding layer can be a bottom cladding layer. Forming the first cladding layer can include forming dielectric material and the substrate, and planarizing the dielectric material (e.g., using chemical-mechanical planarization (CMP)). The first cladding layer can include any suitable dielectric material (e.g., silicon dioxide ($SiO_2$)).

At block 713, a waveguide is formed on the first cladding layer. For example, a patterning loop can be performed to form the waveguide. For example, forming the waveguide can include forming a waveguide material layer on the first cladding layer, forming an etch mask on the waveguide material layer in a region defining the waveguide, and etching the waveguide material layer to remove exposed portions of the waveguide material layer and form the waveguide. A post-etch clean process can be performed after etching the waveguide material. The waveguide can include any suitable waveguide material. One example of a suitable waveguide material is silicon nitride (SiN). The waveguide material layer can be formed by depositing waveguide material using any suitable deposition process. In some embodiments, forming the waveguide material layer includes depositing the waveguide material, and planarizing the waveguide material to form the waveguide material layer (e.g., using CMP).

At block 714, a second cladding layer is formed on the waveguide. For example, the second cladding layer can be a top cladding layer. Forming the first cladding layer can include forming dielectric material and the substrate, and planarizing the dielectric material (e.g., using CMP). The second cladding layer can include any suitable dielectric material (e.g., $SiO_2$). The first cladding layer and the second cladding layer can collectively form a cladding structure for the waveguide.

At block 715, it is determined whether waveguide formation is completed. If not, then the process can revert back to block 712 to form another cladding layer on the second cladding layer. Otherwise, at block 716, at least one set of waveguides can be connected to at least one optical switch and a set of multiplexers. The at least one set of waveguides can include the waveguides formed via blocks 712-713. For example, a set of waveguides can include waveguides 215-1 through 215-3 of FIGS. 2A-2B, an optical switch can be the optical switches 210-1 of FIGS. 2A-2B, and the set of multiplexers can include the set of multiplexers 220-1 through 220-3 of FIGS. 2A-2B. Further details regarding blocks 712-716 are described above with reference to FIGS. 2A-7A.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

As used herein, the singular forms "a," "an," and "the" include plural references unless the context clearly indicates otherwise. Thus, for example, reference to "a precursor" includes a single precursor as well as a mixture of two or more precursors; and reference to a "reactant" includes a single reactant as well as a mixture of two or more reactants, and the like.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within +10%, such that "about 10" would include from 9 to 11.

The term "at least about" in connection with a measured quantity refers to the normal variations in the measured quantity, as expected by one of ordinary skill in the art in making the measurement and exercising a level of care commensurate with the objective of measurement and precisions of the measuring equipment and any quantities higher than that. In certain embodiments, the term "at least about" includes the recited number minus 10% and any quantity that is higher such that "at least about 10" would include 9 and anything greater than 9. This term can also be expressed as "about 10 or more." Similarly, the term "less than about" typically includes the recited number plus 10% and any quantity that is lower such that "less than about 10" would include 11 and anything less than 11. This term can also be expressed as "about 10 or less."

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to illuminate certain materials and methods and does not pose a limitation on scope. No language in the specification should be construed as indicating any non-claimed element as essential to the practice of the disclosed materials and methods.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
an optical interconnect comprising:
    a plurality of multiplexers, each multiplexer of the plurality of multiplexers being coupled to an optical switch in a set of optical switches, wherein each optical switch of the set of optical switches is implemented using an interferometer; and
    a plurality of sets of optical splitters, wherein each set of optical splitters of the plurality of sets of optical splitters is coupled to a respective multiplexer of the plurality of multiplexers; and
a set of photonic integrated circuits (PICs) integrated within the optical interconnect.

2. The system of claim 1, wherein each optical switch receives a respective optical signal having a respective wavelength from an optical signal source.

3. The system of claim 1, wherein the interferometer is a ring-assisted interferometer.

4. The system of claim 3, wherein the interferometer is a ring-assisted Mach-Zehnder interferometer (RAMZI).

5. The system of claim 1, wherein the interferometer is a multi-stage interferometer.

6. The system of claim 1, wherein the plurality of multiplexers comprises at least one of: a multimode interferometer (MMI), an arrayed waveguide grating (AWG), or a ring interleaver.

7. The system of claim 1, wherein each set of optical splitters of the plurality of sets of optical splitters generates a plurality of split optical signals to be sent to at least a subset of PICs of the set of PICs.

8. The system of claim 1, wherein each PIC of the set of PICs comprises a modulation component to modulate a first set of optical signals received from the optical interconnect, and a demodulation component to demodulate a second set of optical signals received from the optical interconnect.

9. The system of claim 8, wherein the modulation component and the demodulation component each comprise a respective set of ring waveguides.

10. A system comprising:
an optical interconnect comprising:
    a plurality of multiplexers, each multiplexer of the plurality of multiplexers being coupled to an optical switch in a set of optical switches, wherein the plurality of multiplexers comprises at least one of: a multimode interferometer (MMI), an arrayed waveguide grating (AWG), or a ring interleaver;
    a plurality of sets of optical splitters, wherein each set of optical splitters of the plurality of sets of optical splitters is coupled to a respective multiplexer of the plurality of multiplexers; and
a set of photonic integrated circuits (PICs) integrated within the optical interconnect.

11. The system of claim 10, wherein each optical switch receives a respective optical signal having a respective wavelength from an optical signal source.

12. The system of claim 10, wherein each optical switch of the set of optical switches is implemented using an interferometer.

13. The system of claim 12, wherein the interferometer is a ring-assisted interferometer.

14. The system of claim 13, wherein the interferometer is a ring-assisted Mach-Zehnder interferometer (RAMZI).

15. The system of claim 12, wherein the interferometer is a multi-stage interferometer.

16. The system of claim 10, wherein each set of optical splitters of the plurality of sets of optical splitters generates a plurality of split optical signals to be sent to at least a subset of PICs of the set of PICs.

17. The system of claim 10, wherein each PIC of the set of PICs comprises a modulation component to modulate a first set of optical signals received from the optical interconnect, and a demodulation component to demodulate a second set of optical signals received from the optical interconnect.

18. The system of claim 17, wherein the modulation component and the demodulation component each comprise a respective set of ring waveguides.

19. A system comprising:

an optical interconnect comprising:

a plurality of multiplexers, each multiplexer of the plurality of multiplexers being coupled to an optical switch in a set of optical switches;

a plurality of sets of optical splitters, wherein each set of optical splitters of the plurality of sets of optical splitters is coupled to a respective multiplexer of the plurality of multiplexers; and a set of photonic integrated circuits (PICs) integrated within the optical interconnect, wherein each PIC of the set of PICs comprises a modulation component to modulate a first set of optical signals received from the optical interconnect, and a demodulation component to demodulate a second set of optical signals received from the optical interconnect.

20. The system of claim 19, wherein:

each optical switch of the set of optical switches is implemented using an interferometer;

each set of optical splitters of the plurality of sets of optical splitters generates a plurality of split optical signals to be sent to at least a subset of PICs of the set of PICs; and the modulation component and the demodulation component each comprise a respective set of ring waveguides.

\* \* \* \* \*